United States Patent [19]

Schwab et al.

[11] Patent Number: 5,196,218
[45] Date of Patent: Mar. 23, 1993

[54] MICROWAVE TOASTING OF UNPUFFED R-T-E CEREALS

[75] Inventors: Edward C. Schwab, New Brighton; George E. Brown, Edina, both of Minn.

[73] Assignee: General Mills, Inc., Minneapolis, Minn.

[21] Appl. No.: 899,574

[22] Filed: Jun. 18, 1992

Related U.S. Application Data

[63] Continuation of Ser. No. 744,546, Aug. 13, 1991, abandoned, which is a continuation-in-part of Ser. No. 726,591, Jul. 8, 1991, abandoned.

[51] Int. Cl.$^5$ .................... A23L 1/00; A21D 15/00
[52] U.S. Cl. ..................... 426/241; 426/242; 426/620; 426/621; 426/808
[58] Field of Search ............... 426/241, 242, 620, 621, 426/622, 808

[56] References Cited

U.S. PATENT DOCUMENTS

| | | | |
|---|---|---|---|
| 3,620,764 | 11/1971 | Watkins | 426/241 |
| 3,682,651 | 8/1972 | McAlister | 426/242 |
| 3,904,429 | 9/1975 | Eastman et al. | 426/242 |
| 3,908,029 | 9/1975 | Fredrickson | 426/242 |
| 4,251,551 | 2/1981 | Van Hulle et al. | 426/242 |
| 4,342,788 | 8/1982 | Clatfelter | 426/243 |
| 4,409,250 | 10/1983 | Van Hulle et al. | 426/242 |
| 4,413,018 | 11/1983 | Webster | 426/618 |
| 4,608,261 | 8/1986 | MacKenzie | 426/242 |
| 4,650,681 | 3/1987 | Greethead | 426/622 |
| 4,800,090 | 1/1989 | August | 426/243 |
| 4,803,090 | 2/1989 | Schlipalius et al. | 426/242 |
| 4,808,782 | 2/1989 | Nakagawa et al. | 426/241 |
| 4,950,492 | 8/1990 | Shachat et al. | 426/808 |
| 4,988,521 | 1/1991 | Fan | 426/621 |
| 5,102,679 | 4/1992 | Whalen | 426/242 |

FOREIGN PATENT DOCUMENTS

| | | |
|---|---|---|
| 0072878 | 3/1983 | European Pat. Off. . |
| 0312363 | 4/1989 | European Pat. Off. . |
| 0375006 | 6/1990 | European Pat. Off. . |
| 2458-226 | 7/1984 | France . |
| 2055285 | 3/1981 | United Kingdom . |
| 2193619A | 2/1988 | United Kingdom . |

OTHER PUBLICATIONS

"Snack, crackle, pop!" Food Manufacture, Mar., 1990, pp. 37–38.

*Primary Examiner*—George Yeung
*Attorney, Agent, or Firm*—John A. O'Toole

[57] ABSTRACT

Microwave methods for toasting an unpuffed ready-to-eat cereal base are provided in full or partial substitution for conventional toasting methods. The methods comprise the step of subjecting a wet cereal base piece to a brief exposure to a high intensity (>125 V/cm) microwave field for about 5 to 25 seconds. The microwave toasted cereal pieces exhibit superior flavor resulting from "interior" toasting of the cereal base.

44 Claims, No Drawings

MICROWAVE TOASTING OF UNPUFFED R-T-E CEREALS

CROSS REFERENCE TO RELATED APPLICATION

This is a continuation of U.S. Pat. application Ser. No. 744,546 filed Aug. 13, 1991, now abandoned, which is a continuation-in-part application to our previous co-pending commonly assigned application entitled Stability Improvement of Oat R-T-E Cereals by High Intensity Microwave Heating, U.S. application Ser. No. 726,591, filed July 8, 1991, now abandoned.

1. FIELD OF THE INVENTION

The present invention relates to food products and to methods for their preparation. More particularly, the present invention relates to ready-to-eat breakfast cereals and to their methods of preparation.

2. BACKGROUND

Ready-to-eat ("R-T-E") breakfast cereals are popular packaged food items. R-T-E cereals exist in large numbers of varieties including puffed and unpuffed, regular or presweetened, and including a wide variety of cereal compositions.

Most R-T-E cereals may be grouped into two broad categories, puffed and unpuffed cereals. Unpuffed cereals include 1) flaked cereals (e.g., corn flakes, wheat flakes, rice flakes, mixed grain flakes), and to a lesser extent 2) shredded whole grains, 3) extruded and other shredded cereals, and 4) granola cereals. The preparation of each of these unpuffed cereal types optionally or essentially comprise a toasting operation. For example, typically, the preparation of flaked cereals essentially comprise toasting the flakes. Conventionally, R-T-E cereal flakes are toasted by oven toasting wet cereal flakes. Flake toasting ovens generally include rotating beds flushed with hot air which gently and evenly toasts the flakes. Flake toasting can also be done by fluidized bed hot air heating. Some, but not all, granola cereals are also toasted. For shredded cereals, the baking step serves to impart some degree of toasting to the finished product.

Generally, such known toasting techniques involve intense heating including radiant and/or conduction heating which involve heat transfer from the exterior of the piece inward. Due to the low density of cereal pieces which insulatively resists conductive heat transfer and due to complex shapes, undesirable scorching of the exterior surface, especially at their edges, can occur prior to the development of desirable toasted flavor by any significant part of the interior of the cereal piece.

In view of the state of the art, there is a continuing need for improvements in the cereal processing art for preparing R-T-E cereals employing toasting.

Accordingly, it is an object of the present invention to provide improved toasting methods for unpuffed R-T-E cereals.

Still another object of the present invention is to provide methods for cereal processing that can be readily practiced in present commercial cereal processing plants without requiring extensive modification of existing cereal processing processes or equipment.

Another object of the present invention is to provide cereal processing method improvements that can be used to toast more evenly irregular and complexly shaped R-T-E pieces.

Another object of the present invention is to provide cereal processing methods that can provide improvements in product stability so as to allow the reduction or elimination of addition of stabilizers to cereal compositions.

Still another object of the present invention is to provide cereal processing methods that can provide toasted unpuffed cereal pieces exhibiting improvements in the evenness of toasting throughout the cereal piece.

Surprisingly, the above objects can be realized and the present invention provides improved methods for dramatically increasing the toasted flavor of unpuffed R-T-E cereals. The present invention involves subjecting R-T-E cereals to a brief exposure to a high intensity microwave field. For sugar coated embodiments, the cereal base can be microwave heated prior to the application of the topical coating. In its product aspect, the present invention resides in improved unpuffed R-T-E cereals prepared by microwave toasting characterized by interior toasting.

The present invention is an improvement over our prior invention in the realization that the benefits of high intensity microwave heating can be used to interiorly heat and tenderize unpuffed R-T-E cereal products for flavor and texture development of a wide variety of cooked cereal dough compositions, not just those comprising cereal oils to impart improved oil stability.

SUMMARY OF THE INVENTION

In its method aspect, the present invention resides in methods of toasting unpuffed R-T-E cereal products with high intensity microwave fields to provide finished R-T-E cereal products exhibiting improved toasted flavor. The methods comprise the step of subjecting the R-T-E cereal piece or cereal base to a brief exposure to a high intensity ($>125$ V/cm) microwave field for about 5 to 45 seconds. The treated cereal pieces exhibit superior improved flavor resulting from "interior" toasting of the cereal base and also color, appearance, and flake size and identity. In its product aspect, the present invention provides unpuffed R-T-E cereals exhibiting improved flavor development, flavor stability, color, appearance, size and identity.

DETAILED DESCRIPTION OF THE INVENTION

The present invention provides improved unpuffed R-T-E cereals and improved cereal processing methods for involve subjecting an unpuffed R-T-E cereal base to a brief exposure to a high intensity microwave field. The methods of the present invention are described in detail below.

Throughout the specification and claims, percentages are by weight and temperatures in degrees Fahrenheit unless otherwise indicated.

A. Providing An Unpuffed Cereal Base

The present methods involve treating an unpuffed R-T-E cereal base. The present cereal base comprises a , plurality of individual pieces of unpuffed R-T-E cereal compositions. While throughout the remainder of the present description of the invention, particular emphasis is placed upon flaked R-T-E cereal embodiments, the skilled artisan will appreciate that the present invention can also find use for processing of other unpuffed cereal types, including granola and shredded cereals whether in the form of individual shreds or shreds fabricated into biscuit pieces.

The cereal base can comprise a wide variety of shapes, densities, and sizes and compositions. The term "unpuffed" is used herein to collectively refer to relatively more dense finished cereal products including, but not limited to, flaked cereals, granola cereals, and shredded cereals and other cereals finished by baking and in contra-distinction to puffed R-T-E cereals. Such unpuffed finished cereal products include both regular and presweetened and/or coated products prepared from an R-T-E cereal base. The unpuffed cereal pieces have relatively smaller volume, higher density base pieces compared to puffed cereals having a bulk density ranging from about 0.08 to 0.4 g/cc (5.7 to 29 oz per 124 in$^3$).

The present invention is particularly suitable for use in connection with the preparation of toasted R-T-E cereal flakes from cooked cereal doughs, especially whole grains and in particular wheat based, especially whole wheat, flaked R-T-E cereal having the following essential ingredients:

| Ingredient | % Weight | Amount (Preferred) |
|---|---|---|
| Bumped whole wheat | 80%–90% | 100 lbs |
| Sugar | 5%–15% | 8–12 lbs |
| Malt syrup | 1%–3% | 1–3 lbs |
| Salt | 0.5%–3% | 0.5–3 lbs |

In the conventional preparation of an unpuffed R-T-E cereal, the essential cereal ingredients and other ingredients are combined with water and heat and mild pressure to cook or gelatinize the starchy component of the cereal ingredients. Thereafter, the cooked cereal is combined with the other ingredients and mixed with low shear to form a cooked farinaceous dough. The dough (optionally with added vitamin/mineral fortification) is formed into pellets which are then in turn pressed to form flakes. A variety of well known cooking methods and equipment can be used to prepare a cooked cereal dough. For example, the wetted cereal blend can be processed in a cooker extruder or in a pressurized and agitated steam cooker each of which form a cooked cereal dough which in turn is fed to a cereal pellet forming extruder. In another embodiment, the cooking and dough forming steps are performed simultaneously in a high pressure, cooker extruder equipped with a pellet-forming diehead. The cooked cereal dough pellets so formed typically range from about 10% to 30% moisture. The pellets can then be dried to about 10% to 14% and tempered to equilibrate the moisture content for further processing. The dried and tempered cereal pellets can be fed to a conventional flaking roll to form a wet cereal base in the form of wet, thin flakes (e.g., about 0.02 to 0.05 inch thickness) of the R-T-E cereal composition.

In another composition variation herein, namely in the preparation of shredded whole grains, cleaned grain is cooked at slightly below 212° F. under atmospheric pressure for about 30 to 40 minutes and a moisture content of 40% to 50%. Thereafter, the cooked cereal grain is cooled and tempered for up to 24 hours to equilibrate the moisture and allow the kernels to firm. The tempered cooked kernels can then be shredded with grooved rolls and formed into individual pieces or biscuits, especially smaller biscuit pieces each weighing about 0.5 to 5g (dry). While some shredded cereals are in the form of loose shreds, most shredded cereals are fabricated into larger individual pieces or biscuits. The individual biscuits are then baked in a band or continuous conveyor-belt oven. The oven is zoned and controlled so that the major heat input to the biscuits is in the first zone(s), where moisture removal occurs in the middle zone(s), and color development/toasting and final moisture removal occurs in the last zone(s).

In the preparation of granola cereals, the major raw material used to make a granola cereal is typically rolled oats, either regular whole-rolled (the old-fashioned type) or quick-cooking oats, although other rolled grains are occasionally employed. Mixed with the oats are other ingredients, such as nut pieces, coconut, brown sugar, honey, malt extract, dried milk, dried fruits (raisins, dates, etc.), water, and vegetable oil. Spices such as cinnamon and nutmeg can also be added. Preferred for use herein are low sugar and fat (i.e., collectively less than 10%) granolas since such formulations are more resistant to scorching upon microwave toasting.

The water, oil, and other liquid flavorings are made into a suspension. The oats are blended with the other dry materials. The liquids and dry blend are mixed together in the proper amounts, and the wetted mass then spread in a uniform layer on the band of a continuous dryer or oven. Small volumes can also be produced by spreading the wetted mass in a uniform layer on baking pans for batch baking.

Baking takes place at temperatures in the range of 300. to 425° F. (149° to 218° C.) until the mat is uniformly toasted to a light brown and moisture reduced to about 3%. After toasting, the mat is broken up into chunky pieces.

Of course, within this general outline of unpuffed cereal processing, a wide variety of particular methods and variations can be used. In the production of an unpuffed R-T-E cereal, various general procedures are used depending upon the desired form, type or condition of the final product.

B. Exposing the Wet Cereal Base to a High Intensity Microwave Field To Form a Microwave Toasted Cereal Base The present methods essentially comprise the step of subjecting the wet cereal base to a high intensity microwave field. In the present invention, a high intensity microwave heating step is employed in full or partial substitution for the conventional toasting or baking steps described above or as supplemental thereto to impart additional toasting.

The cereal base prior to microwave toasting desirably has a moisture content adjusted to about 2% to 14%, preferably about 2% to 7%. As a result of the present microwave heating step, the moisture content is reduced to about 1% to 6% to form a microwave toasted cereal base. Insufficient moisture prior to microwave heating can result in poor finished product flavor, color, appearance, and shelf stability. However, excessive moisture contents can result in additional undesirable puffing which in turn may adversely affect the finished product's texture, volume, or shape.

Generally, the wet cereal flakes have a moisture content of about 20–30% immediately after the flaking step. The wet flakes desirably are next dried using conventional drying equipment and techniques to the above moisture content range.

Commercial cereal production is generally continuous and the wet cereal pieces after shaping and drying can be fed while still warm (about 110° to 130.F) to the microwave unit for microwave toasting. In batch processing where the flakes, biscuits or granola are allowed to cool prior to microwaving, the microwave heating step is continued slightly longer within the below given duration ranges.

Surprisingly, the intense microwave heating treatment gives a toasting quality to the product. In part, this effect is surprising because when comparable wet cereal base pieces are subjected to lower intensity microwave fields such as are characteristic of consumer microwave ovens, the stability and flavor development benefits are not obtained. Cereal base pieces even when microwave heated in low quantities at low field strengths characteristic of consumer microwave ovens for extended times merely result in finished products undesirably exhibiting hardness and/or charring without the flavor and stability benefits provided herein. For reasons not understood, the pieces do not toast but quite suddenly transform from untoasted to burnt.

More surprisingly, the toasting gradient herein is from the inside of the cereal piece outward rather than being outward to inward as would be obtained by toasting in a conventional toasting oven. Such a toasting is important to providing a more enhanced toasted cereal taste without causing a burnt flavor to develop or undesirable surface dark spots. Moreover, the toasting gradient is low and toasting is more even or homogeneous both edge to center and surface to center point in contrast to conventional oven toasting which often tends to burn the edges of the flakes. This evenness of toasting attribute is even more important to complexly shaped cereal pieces (e.g., irregularly sized and shaped flakes) compared to more uniformly or simply shaped pieces.

Importantly, the present high intensity microwave exposure step is to be distinguished from heating of the wet cereal base pieces in a conventional microwave oven. A conventional microwave oven is characterized by a relatively low field intensity, i.e., about 10 to 20 V/cm. Microwave field intensity can be described, of course, in various intensity is described in a conventional manner as a voltage gradient in free space, e.g., volts per centimeter ("V/cm"). For comparison, the field strength of the present invention is about 3 to 10 or more times greater than achieved in a conventional consumer microwave oven. Such high microwave field intensity can in turn involve high energy dissipation ($>100$ w/g) in the product. In contrast, in a conventional microwave oven, as the unit's rated power increases, generally the unit's cavity size also increases so that the field strength remains relatively constant. This power density feature is important not only so that the operating/cooking performance remains relatively uniform regardless of cavity size but also to provide premature burn-out of the magnetron by reverse channeling or microwave reflection through the wave guide.

In the present invention, the cereal base pieces are desirably subjected to a microwave density field ranging greater than 125 V/cm or between about 3 to 10 times ("3×-10×") conventional microwave field intensity, preferably 125 to 350 V/cm, more preferably 150 to 300 V cm. Also, it is preferred to use higher microwave frequencies. Thus, between the two licensed MW frequencies permitted at present, a 2450 MHz frequency is highly preferred to 915 MHz. Higher frequencies importantly give more uniformity in field strength which in turn can result in greater uniformity in the finished product.

Measurement and/or calculation of field strength can be troublesome. Useful to measure such high intensity microwave field strength herein is a Microwave E-Field Probe or meter (Model No. MEF-1.5) available from Luxtron Corp.

Microwave equipment that can provide the desired field strength is commercially available. Useful herein for practicing the present methods are industrially sized microwave ovens from Cober Electronics, Inc. and, preferably APV Baker, Inc. (For a good description, see GB 2,193,619A by R. J. Meredith and John Milton.) Minor modifications to the equipment may be required to adapt the equipment from a known application, e.g., rubber curing, to the sanitary standards that are conventional for food processing.

The exposure of the wet R-T-E cereal base to the high intensity microwave field is continued for sufficient time to impart to the base the desired toasted flavor benefits taught herein. Of course, the particular exposure times will vary depending upon such factors as the degree of toasting preferred, the microwave performance characteristics of the equipment selected including the microwave field characteristics it develops; the microwave absorbing characteristics of the cereal base, the quantity of pieces being processed at any time, the starting and ending moisture contents, etc. However, good results generally are obtained when the wet cereal base pieces are exposed for times ranging from about 5 to 45 seconds. Better results in terms of toasting and stability improvements are obtained when exposure times range from about 10 to 30 seconds. For best results, exposure times desirably range from about 15 to 25 seconds. Generally, longer exposure times are selected when greater toasting is desired. Conversely, when only enhanced stability is desired with little or no toasting, shorter exposure times can be employed.

The toasted cereal pieces obtained by the present methods beneficially dramatically exhibit enhanced stability, especially when comprising a triglyceride component, which in turn provides the product with dramatic improvements in shelf life and product quality. This feature is especially desirable for R-T-E cereals fabricated from cereal compositions comprising the oil bearing germ fraction or lipid fraction, especially whole grain compositions such as whole wheat, corn, barley, oats, rice, rye or mixed whole grain compositions. An additional advantage is that the present products can be formulated so as to reduce or eliminate added oil stabilizing ingredients such as tocopherol and other antioxidants.

Still another surprising advantage of the present invention is that the present methods allow for the even toasting of complexly shaped unfilled (i.e., without a fruit paste filling) shredded biscuit R-T-E cereal pieces. Heretofore, when complex shapes such as shredded cereal biscuits are toasted by known toasting methods involving radiant or conductive heat, the recessed portions of the cereal pieces resist toasting development resulting in low homogeneity. While conventional oven baking of cereal biscuits can result in some toasted cereal flavor development, the present microwave toasting methods provide dramatic improvements.

Still another advantage of the present invention resides in the reduction in piece breakage. The present microwave toasting step causes less piece breakup than does conventional tumbling bed or hot air fluidized bed toasting. Consumers, of course, find high levels of cereal fines to be undesirable.

For those embodiments to be topically coated, the simplest and preferred variation is to microwave treat the cereal base prior to the application of the sugar coating. In a less preferred embodiment, the coated product can be microwave treated.

In the production of regular, i.e., not presweetened by the application of a sugar coating, the microwave toasted pieces are dried by the toasting operation to a final moisture content of about 3%. In the production of presweetened as well as flavored or bit coated, the microwave toasted pieces can be toasted slightly less to a slightly higher moisture content charged directly to an enrober at their exiting 6% moisture content and are then tumbled and dried and thus coated with the topical coating materials. As part of the coating operation, the moisture content is reduced to the required 3% levels.

In certain highly preferred embodiments of the present invention, the microwave toasted R-T-E pieces additionally include a flavor coating such as a presweetening coating. Well known compositions and presweetener coating application techniques can be employed both for sugar coating or when various high potency sweeteners, e.g., aspartame or acetylsulfame K. In more preferred embodiments, the presweetening coating comprises, a flavor constituent, oil and/or vitamins. The addition of a flavor constituent to the sugar coating solution is preferred due to flavor losses that can occur from the frying, toasting or puffing steps practiced herein. These steps, due to their heat application, tend to drive off the volatile flavor constituents leading to flavor degradation or loss. In certain other preferred embodiments, the coating can also include particulates such as fruit and nut pieces and/or small cereal grain flakes.

After microwave toasting, the microwave treated pieces are allowed to cool to ambient temperature and then subsequently packaged and distributed in conventional manner.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure. It will be appreciated that other modifications of the present invention, within the skill of the R-T-E cereal art, can be undertaken without departin from the spirit and scope of the invention.

EXAMPLE 1

In order to show the benefit of microwaves in toasting a finished R-T-E cereal in the form of shreds, a high fiber (12g/oz) wheat/corn based shred product (marketed under the name "Fiber One") was toasted by the method of the present invention. This product is not normally toasted due to an unacceptably dark color when toasted by conventional methods. Specifically, 1.2 lbs/min of the product, taken directly after drying to 2.5% moisture, was microwaved in a high intensity microwave unit (available from APV Baker at a rated power capacity of 13.5 kW). All 13.5 kW of power were used and the residence time in the microwave was 40 sec. The field intensity during the microwave toasting was about 70 V/cm. The finished product had a pleasant toasted flavor which was not present in the untreated control. Despite the additional toast, the surface color showed little or no change.

EXAMPLE 2

An advantage of the present invention is that the present microwave toasting herein involves less physical abuse of the cereal flakes. Conventional flake toasting which involves a rotating bed of flakes can result in flake breakage, especially for thinner flakes. The present microwave toasting methods eliminate the tumbling of the flakes, thus markedly reducing flake breakage and reducing the undesirable generation of cereal fines.

In order to show the benefits of finish toasting flakes by the method of the present invention, a corn flake was prepared with the following formula wherein the microwave toasting is used as either or partial substitution or supplemental toasting:

| | |
|---|---|
| Corn cones | 91.7% |
| Sugar | 5.3% |
| Salt | 2.0% |
| Minor ingredients | 1.0% |

The cereal ingredients were formed into a cooked cereal dough in a twin screw cooker extruder, pelletized, and formed into wet flakes. The flakes were dried and lightly toasted in an oven to a moisture of about 4%. These flakes were fed to the high intensity microwave unit at a feed rate of 0.5 lb/min. The variable power was set at 9 kW and the residence time at 21 seconds in the microwave chamber. The field intensity during the microwave finish toasting was about 200 V/cm. The microwaved product had a very toasted flavor and somewhat darker color than the feed product. The corn flavor was also enhanced. At 7.5 kW, the finished product had a good toast with modestly improved corn flavor.

EXAMPLE 3

A whole wheat vitamin fortified R-T-E cereal is prepared having the following formulation:

| Ingredient | Weight % |
|---|---|
| Wheat cereal | 84.00 |
| Sugar | 10.00 |
| Tricalcium phosphate | 1.70 |
| Malt syrup | 1.60 |
| Salt | 1.40 |
| Vitamin mix | 0.60 |
| Sodium ascorbate | 0.20 |
| Annatto food coloring | 0.10 |
| Trisodium phosphate | 0.10 |
| Vitamin A-D blend | 0.05 |
| Antioxidant BHT | 0.01 |
| spray dried | |
| | 100.00% |

The R-T-E cereal is in the form of partially toasted flakes having a moisture content of 2.8% prior to high intensity microwave toasting.

The whole wheat flakes are then finish toasted by high intensity microwave heating as in Example 1 except that the power setting was 9 kW, a feed rate of 1.3 lb/min, a residence time of 36 sec, a final moisture content of 2.65% and a field intensity of about 174 V/cm. The finished produce exhibited good color and improved toasted wheat flavor.

What is claimed is:

1. A method for toasting an unpuffed R-T-E cereal base to improve its flavor and texture, comprising the step of:
   subjecting an unpuffed R-T-E cereal base to a high intensity microwave field for a sufficient period of time to toast the cereal base to provide a toasted R-T-E cereal base,
   wherein the microwave field has a field strength of about 125–350 V/cm.
2. The method of claim 1
   wherein the wet R-T-E cereal base has a moisture content of about 2% to 10% by weight.
3. The method of claim 2
   wherein the cereal base is selected from the group consisting of flakes, shreds, shredded biscuits, granolas and mixtures thereof.
4. The method of claim 3
   wherein the cereal base has a bulk density ranging from about 5.7 to 29 oz/124 in$^3$.
5. The method of claim 4
   wherein the microwave heating step is continued for about 5 to 45 seconds.
6. The method of claim 5
   wherein the cereal base is fabricated from a cereal composition comprising a whole cereal grain.
7. The method of claim 6
   wherein the R-T-E cereal base is fabricated from a cereal composition comprising a whole grain selected from the group consisting of whole wheat, whole corn, oats and mixtures thereof.
8. The method of claim 7
   wherein the microwave field density is about 250–350 V/cm.
9. The method of claim 8 additionally comprising the step of:
   applying a topical sweetener coating to the microwave toasted R-T-E cereal base to form a presweetened toasted R-T-E cereal.
10. The method of claim 8
    wherein the cereal base is in the form of a flake.
11. The method of claim 8
    wherein the cereal base is in the form of a granola.
12. The method of claim 8
    wherein the cereal base is in the form of a shred.
13. The method of claim 8
    wherein the cereal base is in the form of a shredded biscuit.
14. The method of claim 11
    wherein the cereal base comprises an oat based granola.
15. The method of claim 10
    wherein the cereal base is a whole wheat flake.
16. The method of claim 10
    wherein the cereal base is a corn flake.
17. The method of claim 8
    wherein the cereal base is presweetened.
18. The method of claim 8
    wherein the cereal piece is a whole wheat shredded biscuit.
19. The method of claim 8
    wherein the cereal base is an oat flake.
20. The product prepared by the method of claim 1.
21. The product prepared by the method of claim 2.
22. The product prepared by the method of claim 3.
23. The product prepared by the method of claim 4.
24. The product prepared by the method of claim 5.
25. The product prepared by the method of claim 6.
26. The product prepared by the method of claim 7.
27. The product prepared by the method of claim 8.
28. The product prepared by the method of claim 9.
29. The product prepared by the method of claim 10.
30. The product prepared by the method of claim 11.
31. The product prepared by the method of claim 12.
32. The product prepared by the method of claim 13.
33. The product prepared by the method of claim 14.
34. The product prepared by the method of claim 15.
35. The product prepared by the method of claim 16.
36. The product prepared by the method of claim 17.
37. The product prepared by the method of claim 18.
38. The product prepared by the method of claim 19.
39. The method of claim 15
    wherein the cereal base comprises
    A. about 80% to 90% whole wheat,
    B. about 5% to 15% sugar,
    C. about 1% to 3% malt syrup, and
    D. about 0.5% to 3% salt.
40. The product prepared by the method of claim 39.
41. The method of claim 8
    wherein the cereal base is in the form of a partially toasted flake.
42. The product prepared by the method of claim 41.
43. The method of claim 7 additionally comprising the step of
    partially toasting the cereal base prior to subjecting the cereal base to the microwave field.
44. The product prepared by the method of claim 43.

* * * * *

UNITED STATES PATENT AND TRADEMARK OFFICE
CERTIFICATE OF CORRECTION

PATENT NO. : 5,196,218
DATED : March 23, 1993
INVENTOR(S) : Schwab et al.

It is certified that error appears in the above-identified patent and that said Letters Patent is hereby corrected as shown below:

Col. 2, line 49 - Between "for" and "involve" insert -- preparing such improved R-T-E cereals. The present methods --.

Col. 2, line 60 - Remove "," at the beginning of the line.

Col. 5, line 41 - Between "various" and "intensity" insert -- ways. In the present invention, the microwave field --.

Col. 5, line 62 - "V cm." should be -- V/cm. --.

Col. 6, line 5 - After "Luxtron Corp." insert -- (Mountain View, CA). --.

Col. 7, line 48 - "departin" should be -- departing --.

Col. 7, line 65 - "70 V/cm" should be -- 170 V/cm --.

Col. 8, line 66 - "produce" should be -- product --.

Signed and Sealed this

Seventh Day of December, 1993

Attest:

BRUCE LEHMAN

Attesting Officer

Commissioner of Patents and Trademarks